United States Patent
Spaulding et al.

(10) Patent No.: US 12,393,656 B2
(45) Date of Patent: Aug. 19, 2025

(54) DETERMINING PHRASES FOR USE IN A MULTI-STEP AUTHENTICATION PROCESS

(71) Applicant: Oracle International Corporation, Redwood Shores, CA (US)

(72) Inventors: Kent Arthur Spaulding, Portland, OR (US); Kenneth Joseph Meltsner, Portland, OR (US)

(73) Assignee: Oracle International Corporation, Redwood Shores, CA (US)

( * ) Notice: Subject to any disclaimer, the term of this patent is extended or adjusted under 35 U.S.C. 154(b) by 202 days.

(21) Appl. No.: 18/116,776

(22) Filed: Mar. 2, 2023

(65) Prior Publication Data

US 2024/0296211 A1   Sep. 5, 2024

(51) Int. Cl.
| | |
|---|---|
| G06F 21/32 | (2013.01) |
| G06F 40/30 | (2020.01) |
| G10L 17/02 | (2013.01) |
| G10L 17/04 | (2013.01) |
| G10L 17/08 | (2013.01) |
| G10L 17/24 | (2013.01) |

(52) U.S. Cl.
CPC .............. *G06F 21/32* (2013.01); *G06F 40/30* (2020.01); *G10L 17/02* (2013.01); *G10L 17/04* (2013.01); *G10L 17/08* (2013.01); *G10L 17/24* (2013.01)

(58) Field of Classification Search
CPC ......... G06F 40/30; G10L 17/02; G10L 17/04; G10L 17/08; G10L 17/24
See application file for complete search history.

(56) References Cited

U.S. PATENT DOCUMENTS

| | | | |
|---|---|---|---|
| 8,812,319 B2 | 8/2014 | Skerpac | |
| 9,015,795 B2 | 4/2015 | B'Far et al. | |
| 9,390,445 B2 | 7/2016 | Sheets et al. | |
| 9,870,461 B2 | 1/2018 | Akula et al. | |
| 2003/0163739 A1* | 8/2003 | Armington | H04L 9/3226 713/186 |

(Continued)

FOREIGN PATENT DOCUMENTS

| | | |
|---|---|---|
| CN | 108346426 A | 7/2018 |
| EP | 3790001 A1 | 3/2021 |

(Continued)

OTHER PUBLICATIONS

"A Practical and Secure Password and Passphrase Generator", Retrieved from https://pthree.org/2017/09/04/a-practical-and-secure-password-and-passphrase-generator/, Sep. 4, 2017, pp. 5.

(Continued)

*Primary Examiner* — Linglan Edwards
*Assistant Examiner* — Saron Matthewos Worku
(74) *Attorney, Agent, or Firm* — Invoke (57) ABSTRACT

The present disclosure provide a multiple factor authentication process using text pass codes. A process performs a first verification of a user using an authentication credential transmitted via a first communication channel. Based on successfully performing the first verification, the process performs a second verification using a textual phrase transmitted to the user via a different communication channel. The words included in the textual phrase can be selected to avoid ambiguous pronunciations and spellings.

24 Claims, 7 Drawing Sheets

(56) References Cited

U.S. PATENT DOCUMENTS

| | | |
|---|---|---|
| 2005/0071168 A1 | 3/2005 | Juang et al. |
| 2007/0186099 A1* | 8/2007 | Beck ................ H04L 63/06 713/159 |
| 2008/0250477 A1 | 10/2008 | Samuelsson et al. |
| 2010/0165981 A1 | 7/2010 | Kuppuswamy et al. |
| 2010/0299143 A1 | 11/2010 | Takeda et al. |
| 2012/0254964 A1 | 10/2012 | Kumar et al. |
| 2014/0188468 A1 | 7/2014 | Dyrmovskiy et al. |
| 2016/0065559 A1 | 3/2016 | Archer et al. |
| 2020/0112560 A1 | 4/2020 | Hunt |
| 2020/0193009 A1* | 6/2020 | Shafet ................ G06F 16/332 |
| 2021/0074273 A1 | 3/2021 | Niu et al. |
| 2022/0310100 A1 | 9/2022 | Saund et al. |

FOREIGN PATENT DOCUMENTS

| | | | |
|---|---|---|---|
| JP | 2006235623 A * | 9/2006 | ............ G10L 17/08 |
| WO | 2005/119653 A1 | 12/2005 | |
| WO | 2018/102462 A2 | 6/2018 | |

OTHER PUBLICATIONS

"Use a Passphrase", Retrieved from https://www.useapassphrase.com/, Retrieved on Nov. 14, 2022, pp. 6.

Kate R., "The logic behind three random words", Retrieved from https://www.ncsc.gov.uk/blog-post/the-logic-behind-three-random-words, Aug. 6, 2021, pp. 5.

Liu et al., "Error-Driven Pronunciation Dictionary Construction for Mandarin Speech Recognition", 2014 9th International Symposium on Chinese Spoken Language Processing (ISCSLP), 2014, pp. 88-92.

Skillen et al., "Myphrase: Passwords from Your Own Words", Jan. 24, 2013, pp. 22.

Yamagishi et al., "AssociPass: A User Authentication System with Word-Pairs for Security against Guess Attack", Apr. 2018, pp. 7.

* cited by examiner

| NO | WORD | CAT |
|---|---|---|
| | BARK | NOUN |
| | BARK | VERB |
| | BAROMETER | NOUN |
| | BARRIER | NOUN |
| | BARTENDER | NOUN |
| | BASE | NOUN |
| | BASEBALL | NOUN |
| | BASIC | ADJ |
| | BASKET | NOUN |
| | BASKETBALL | NOUN |
| | BATH | NOUN |
| | BATHE | VERB |
| | BATHROOM | NOUN |
| | BATTER | NOUN |
| | BATTERY | NOUN |
| | BATTLE | NOUN |
| | BATTLE | VERB |
| | BE | VERB |
| | BEACH | NOUN |
| | BEAK | NOUN |
| | BEAN | NOUN |
| | BEAR | NOUN |
| | BEARD | NOUN |
| | BEAT | VERB |
| | BEAUTIFUL | ADJ |
| | BEAUTY | NOUN |
| | BECAUSE | CONJ |
| | BECOME | VERB |
| | BED | NOUN |

401

| NO | WORD | CAT | CODE |
|---|---|---|---|
| 1 | BASES | NOUN | B200 |
| 2 | BEACH | NOUN | B200 |
| 3 | BEAKS | NOUN | B200 |
| 4 | BASIC | ADJ | B220 |
| 5 | BATHS | NOUN | B300 |
| 6 | BATHE | VERB | B300 |
| 7 | BEATS | VERB | B300 |
| 8 | BEANS | NOUN | B500 |
| 9 | BEARS | NOUN | B600 |
| 10 | BARKS | NOUN | B620 |
| 11 | BARKS | VERB | B620 |
| 12 | BEARD | NOUN | B630 |

403

| NO | WORD | CAT | CODE |
|---|---|---|---|
| 1 | BASES | NOUN | B200 |
| 2 | BEACH | NOUN | B200 |
| 3 | BEAKS | NOUN | B200 |
| 4 | BATHS | NOUN | B300 |
| 5 | BEANS | NOUN | B500 |
| 6 | BEARS | NOUN | B600 |
| 7 | BARKS | NOUN | B620 |
| 8 | BEARD | NOUN | B630 |

DETERMINING PHRASES FOR USE IN A MULTI-STEP AUTHENTICATION PROCESS

INCORPORATION BY REFERENCE; DISCLAIMER

The following application is hereby incorporated by reference: application Ser. No. 18/159,514, filed Jan. 25, 2023. The applicant hereby rescinds any disclaimer of claims scope in the parent application(s) or the prosecution history thereof and advise the USPTO that the claims in the application may be broader that any claim in the parent application(s).

TECHNICAL FIELD

The present disclosure relates to authenticating identities of individuals and, more specifically, to two-factor authentication using multiple communication channels and biometrics.

BACKGROUND

Authenticating identities of users attempting to access protected computing resources is important in many contexts. A common issue with conventional authentication techniques is the tradeoff between security and usability. For example, passwords are difficult to memorize. As a result, individuals often choose weak passwords that are easily cracked. On the other hand, strong passwords may be difficult to crack but are also difficult to remember. As a consequence, individuals may insecurely record passwords, which risks their theft and misuse. Accordingly, relying solely on passwords is an imperfect authentication measure.

Two-factor authentication can improve the security of system using passwords or other such tokens for authentication. Two-factor authentication requires an individual to provide two unique and distinct identifiers. For example, a first factor can be a password possessed by an individual and transmitted to an authentication system for verification via the Internet. A second factor can be a challenge, such as a CAPTCHA, or a single-use, time-limited numeric pass code transmitted to the individual via a telephone network. The individual can then verify their identity by transmitting a challenge-response or the numeric pass code to the authentication system for verification within a limited time period. Numeric pass codes, however, suffer from similar issues of security and usability as passwords. For example, six digit numeric pass codes are difficult for many people to hold in their memories for even a short period of time.

The approaches described in this Background section are ones that could be pursued, but not necessarily approaches that have been previously conceived or pursued. Unless otherwise indicated, it should not be assumed that any of the approaches described in this section qualify as prior art.

BRIEF DESCRIPTION OF THE DRAWINGS

The embodiments are illustrated by way of example and not by way of limitation in the figures of the accompanying drawings. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in different embodiments. In some examples, well-known structures and devices are described with reference to a block diagram in order to avoid unnecessarily obscuring the present invention.

The embodiments are illustrated by way of example and not by way of limitation in the figures of the accompanying drawings. It should be noted that references to "an" or "one" embodiment in this disclosure are not necessarily to the same embodiment, and they mean at least one.

This Detailed Description section includes the following subsections:

A. GENERAL OVERVIEW
B. AUTHENTICATION ENVIRONMENT
C. TEXTUAL AUTHENTICATION SYSTEM ARCHITECTURE
D. AUTHENTICATING WITH TEXTUAL PASS-CODES
E. HARDWARE OVERVIEW
F. MISCELLANEOUS; EXTENSIONS

A. General Overview

Systems and methods disclosed herein implement a word-based authentication process using textual pass codes. The textual pass codes minimize ambiguity of spoken responses by including combinations of words having dissimilar pronunciations and spellings. One or more embodiments select words for pass codes from textual corpuses, such as dictionaries, mapping the words with feature vectors representing pronunciations of the words. Using the feature vectors, embodiments generate pass codes by combining two or more words having dissimilar pronunciations.

An example system performs multifactor authentication of a user's identity. In a first authentication, the system receives authentication information (e.g., login information) transmitted by the user via a first communication channel. Based on successfully verifying the authentication information, the system performs a second authentication using a textual pass code. The system generates the pass code by selecting two or more different words having feature vector values corresponding to different pronunciations and/or spellings. The difference can be a predetermined distance value representing a minimum difference between (a) a first feature vector corresponding to a first word and (b) a second feature vector corresponding to a second word. The system transmits the pass code to the user via a same or different communication channel than that used to receive the authentication information used for the first verification. The pass code can be a single-use, limited-time token provided as text or audio. The system prompts the user to provide audio input that vocalizes the pass code transmitted to the user. In response, the system receives audio input that includes the pass code, as spoken by the user. The system converts the spoken pass code into text, and verifies that the converted text matches or substantially matches the pass code transmitted to the user. Responsive to successfully completing the verifications, the system authorizes user access for a resource.

One or more embodiments disclosed herein improve existing computing systems by using textual phrases as authentication pass codes, which makes the authentication pass codes memorable and repeatable for users and distinguishable when vocalized. Words and textual phrases with an associated meaning may be, for some users, more memorable than a sequence of digits. Additionally, using words and textual phrases as authentication codes improves on existing computing systems by generating authentication codes that are usable by individuals with visual impairment and short-term memory deficiencies. Furthermore, using words and textual phrases as authentication codes improves on existing computing systems by matching spoken words or textual phrases to voice prints to verify that users are known individuals, rather than fraudsters or computer-generated entities.

While this General Overview subsection describes various example embodiments, it should be understood that one or more embodiments described in this Specification or recited in the claims may not be included in this subsection.

B. Authentication Environment

Figure 1:
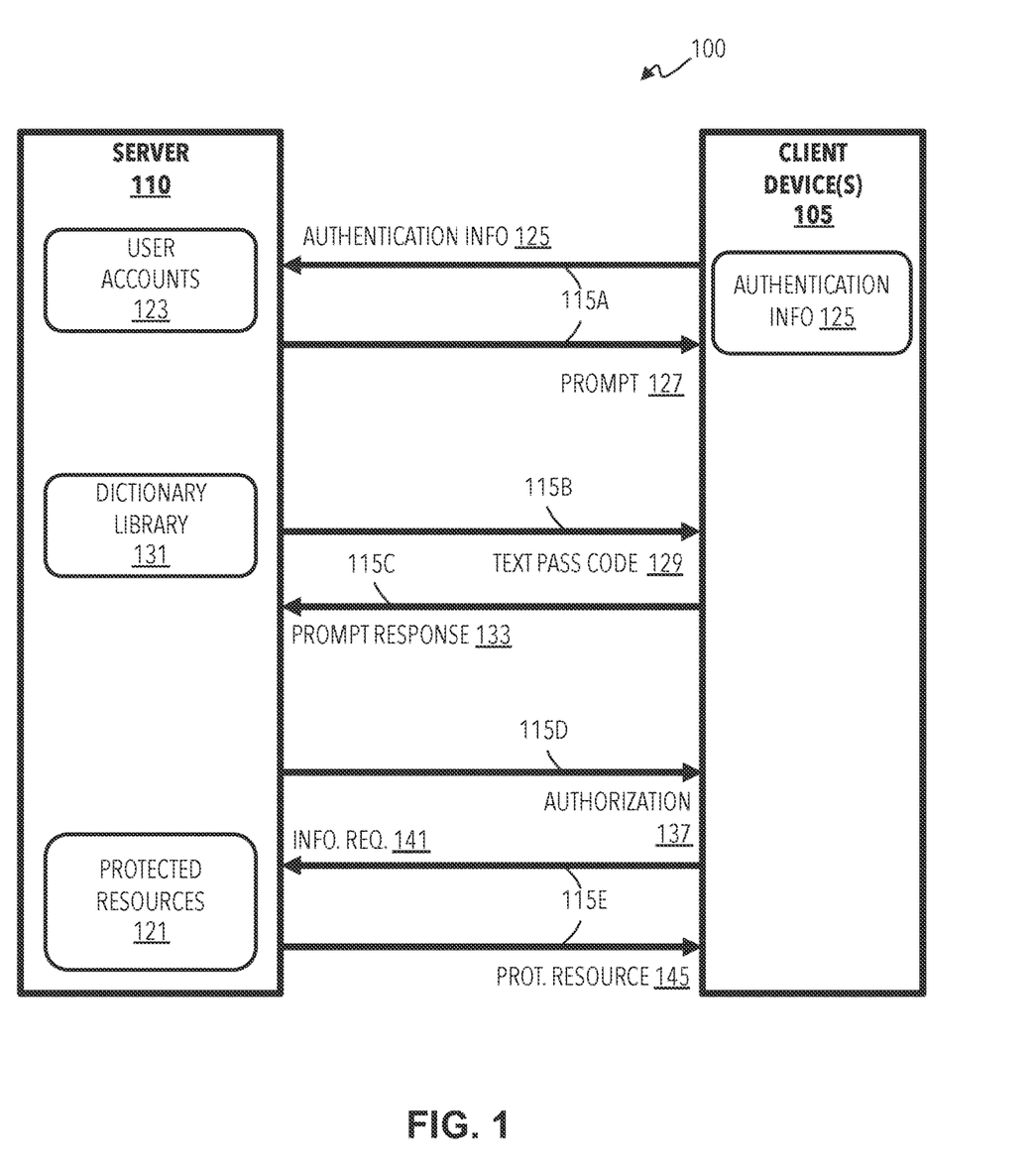
FIG. 1 illustrates a functional flow block diagram of an example system in accordance with one or more embodiments.

FIG. 1 shows a system block diagram illustrating an example computing environment 100 for implementing systems and processes in accordance with one or more embodiments. The computing environment 100 includes one or more client devices 105 and a server 110. The client devices 105 can be computing systems communicatively connected, directly or indirectly, to the server 110 via two or more different communication channels 115A, 115B, 115C, 115D, and 115E.

A client device 105 can be one or more computing devices allowing a user to access and interact with the server 110. The client device 105 can be a personal computer system, a smartphone, a tablet computer, a laptop computer, or other programmable user computing device. The client device 105 can include one or more computer processors that process software or other computer-readable program instructions and includes a non-transitory computer-readable memory that stores the software, program instructions, and data. The data can include a user authentication information 125, such as a password, a biometric input (e.g., fingerprint or facial recognition), random token, or the like. The client device 105 can also include a communication device that can communicate with server 110 via the communication channels 115. Additionally, the client device 105 can generate a computer-user interface enabling a user to interact with the client device 105 and the server 110 using input/output devices (e.g., keyboard, pointer device, touchscreen, microphone, and speaker). For example, the client device 105 can execute a web browser application that generates an interactive user interface (e.g., a graphic user interface) with which a user can interact with an authentication process of the server 110 to verify the identity of the user and request one or more protected resources 121.

The server 110 can be one or more computing systems that selectively authorize access to the protected resources 121. The server 110 can be one or more server computers, personal computers, or other programmable user computing devices. As discussed below, the server can include one or more processors that execute computer-readable instructions configuring the server 110 execute an authorization process that verifies the identity of a user of the client device 105 for accessing the protected resources 121 based on a user account 123. The protected resources 121 can be any type of data file or a collection of data files. For example, the protected resources 121 can be account information, audio and/or visual media files, text media files, documents, data files, software, etc.

The communication channels 115A, 115B, 115C, 115D, and 115E can include wired or wireless data links and/or a communication networks, such as local area networks, peer-to-peer networks, wide area networks, telephone networks, and the Internet. One or more of embodiments of the client device 105 communicate with the server 110 through at least two different communications channels comprising the communication channels 115. For example, the first communication channel can be the Internet and a second communication channel can be a cellular telephone network.

As an example, the server 110 can be an authorization system of a streaming video service at which the user has a user account. The protected resources 121 can be an audio-visual media files available to customers of the streaming video service. The server 110 can authorize a user of the client device 105 to access the protected resources 121. The client device 105 can be a smart phone executing a mobile Web browser or application that establishes a connection with the server 110 via an Internet communication channel 115A. As illustrated in FIG. 1, using the client device 105, the user can transmit an authentication information 125 to the server 110 via the Internet communication channel 115A. The authentication information 125 can be a username and a password, a token, or other unique identification credential. The server 110 can verify the received authentication information 125 using information of the user stored in the user accounts 123.

In response to successfully verification of the authentication information 125, the server 110 can transmit a prompt 127 to the client device 105 requesting the user provide an authentication pass code 129. In some implementations, the server 110 can transmit the prompt 127 using the Internet communication channel 115A. Alternatively, the server 110 can transmit the prompt 127 using a telephonic communication channel 115B. For example, the server 110 can transmit the prompt 127 using a text messaging protocol (e.g., using the Short Message Service (SMS)) or a multimedia messaging protocol (e.g., Multimedia Messaging Service (MMS)). While FIG. 1 illustrates the prompt 127 being sent to the same client device 105 that transmitted the authentication information 125, some embodiments can send the prompt 127 to a second client device 105 of the user. For example, where the client device 105 transmits the authentication information 125 is the user's smartphone, the second client device 105 can be the user's tablet computer or personal computer.

In addition to the prompt 127, the server 110 can transmit the pass code 129 to the user for responding to the prompt 127. The server 110 can generate the pass code by selecting two or more words from one or more dictionaries in dictionary library 131. The dictionaries can include words mapped to feature vectors representing pronunciations of the words and sorted into a sequential order based on the corresponding feature vectors. Using the feature vectors, embodiments generate the pass code 129 by selecting and combining two or more words with feature vector values having values greater than a predetermined minimum difference. By doing so, the system selects words having markedly dissimilar pronunciations or spellings to minimize ambiguity for the user and the system. The text pass code 129 can be transmitted to the user as text or as audio using a communication channel 115B, which is different than the communication channel 115A used for receiving the authentication information 125. For example, the text pass code 129 can be a textual phrase, such as "brown bears," which can be presented to the user as text and/or audio at the client device 105.

Using input/output devices of the client device 105, the user can input the text pass code 129 in response to the prompt 127 and transmit a prompt response 133 to the server 110. For example, the user can speak the textual phrase using a microphone of the client device 105 and then trigger transmission of the prompt response 133. The server 110 can receive the prompt response 133 from the client device 105 and verify the spoken phrase is the voice of the user by voice matching the received prompt response 133 to a voice print of the user in the user accounts 123. Further, the server 110 can process the spoken phrase using voice recognition techniques to translate the spoken phrase to text. Using the text obtained from the translation, the server 110 can verify that the text at least substantially matches the text pass code 129 transmitted to the user. For example, the server 110 may verify that the prompt response 133 matches the pass code 129, or that the prompt response 133 is a near miss or homonym of the pass code 129. For example, if the text pass code 129 is "brown bears," the server 110 may accept alternative outputs from the speech-to-text-conversion, such as: "brown bear" and "brow bears".

Based on successfully verifying the prompt response 133, the server 110 can communicate an authorization to the client device 105 via Internet communication channel 115D, which can be the same as communication channel 115A. The server 110 can then receive an information request 141 for the protected resources 121 from the client device 105, based on the authorization 137, transmit the requested protected resources 121 to the client device 105.

C. Textual Authentication System Architecture

Figure 2:
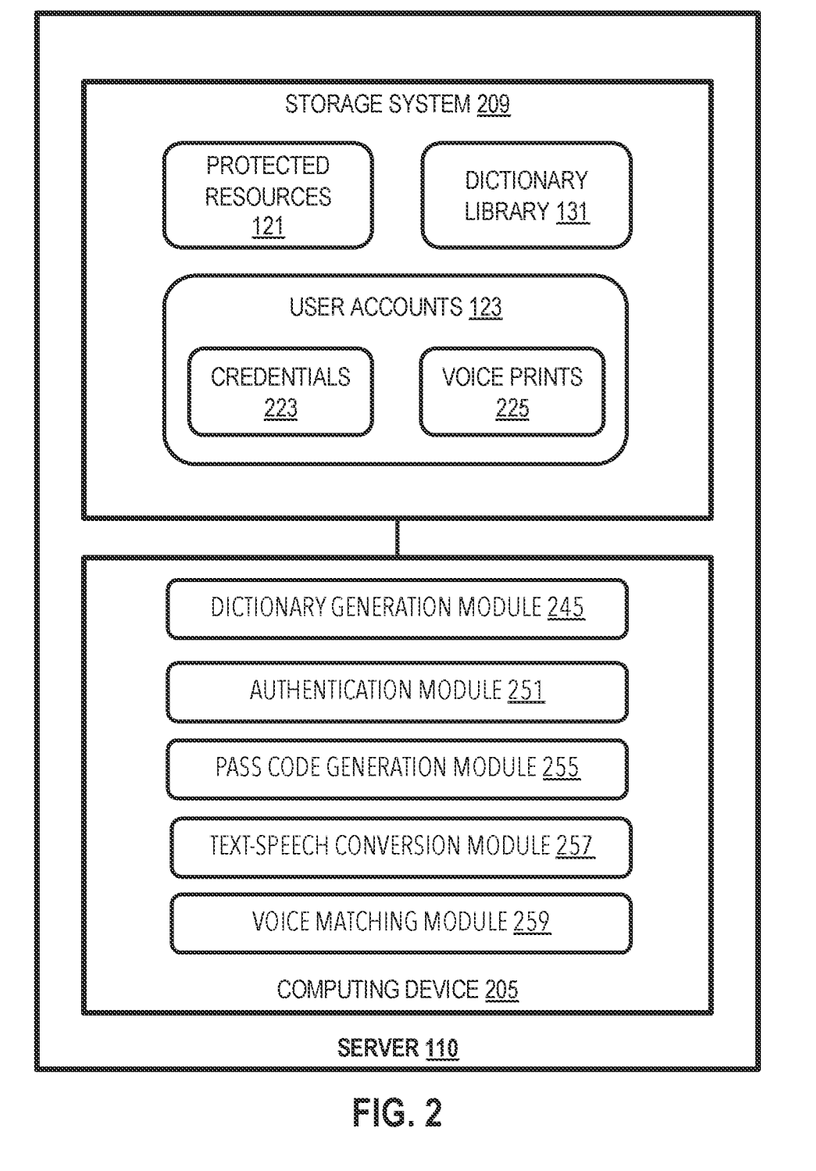
FIG. 2 illustrates a block diagram of an example system in accordance with one or more embodiments.
Figure 6:
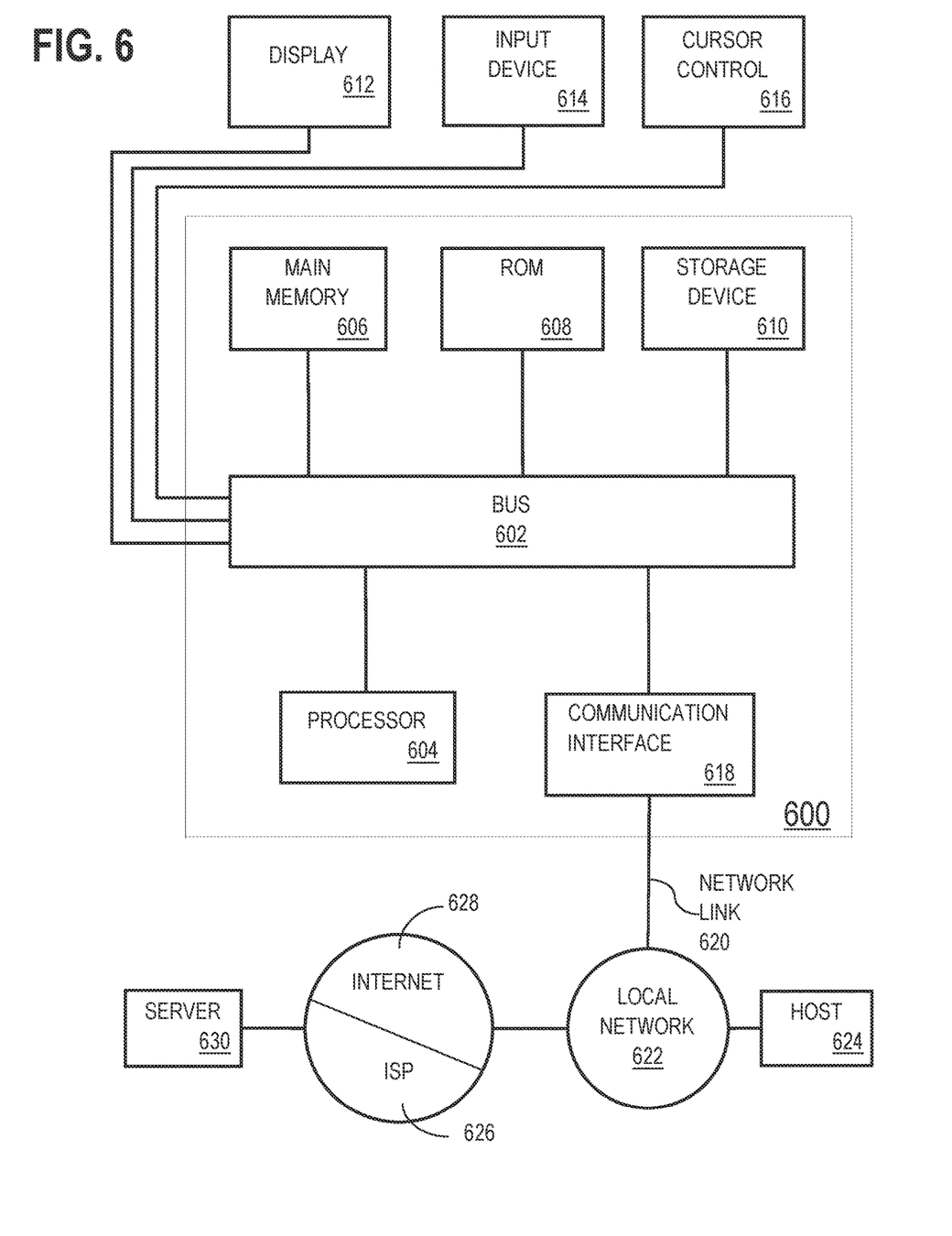
FIG. 6 shows a block diagram illustrating an example computer system in accordance with one or more embodiments.

FIG. 2 shows a system block diagram illustrating an example of a server 110 in accordance with one or more embodiments. The server 110 can be the same or similar to that described above. The server 110 includes hardware and software that perform processes and functions disclosed herein. The server 110 can include a computing device 205 and a storage system 209. As illustrated in FIG. 6 below, the computing device 205 can include one or more processors, such as a microprocessor, a microchip, or an application-specific integrated circuit. The storage system 209 can comprise one or more non-transitory computer-readable, hardware storage devices that store information and computer-readable program instructions used by the processes and functions disclosed herein. For example, the storage system 209 can include one or more flash drives and/or hard disk drives.

Additionally, the storage system 209 can store protected resources 121, user accounts 123, and dictionary library 131, which can be the same or similar to those described above. The user accounts 123 can store copies or representations (e.g., a salted hash value) of user credentials 223 (such as authentication information 125) and user voice prints 225. The voice prints 225 can be models of users' voices generated based on samples obtained from users during, for example, an enrollment process. The voice prints 225 can represent users' spoken voices based on frequency, duration, and/or amplitude. It is understood that some or all of the information stored in storage system 209 can be stored at a location remote from the server 110 (e.g., in network-accessible storage or at client devices 105).

The dictionary library 131 can include one or more dictionaries of words or phrases from which the server 110 can obtain or generate the codes (e.g., text pass code 120). The individual dictionaries can be populated with respective sets of words. Some embodiments populate the dictionaries with words a predefined lengths (e.g., 5 characters). Furthermore, the dictionary library 131 can include multiple dictionaries populated with words that relate to each other, such as different parts of speech. For example, the dictionary library 131 can include two dictionaries of words, wherein the first dictionary includes only adjectives, and the second dictionary includes only nouns.

The computing device 205 can execute a dictionary generation module 241, a pass code selection module 245, an authentication module 251, a text pass code generation module 255, a text-speech conversion module 257, and voice matching module 259, each of which can be software, hardware, or a combination thereof.

The dictionary generation module 245 can generate custom dictionaries by selecting and sorting words from one or more reference dictionaries. The reference dictionaries can be, for example, general purpose dictionaries of one or more languages, such as The American Heritage® Dictionary of the English Language by HarpersCollins Publishers. The custom dictionaries can include metadata corresponding to individual words, including identifiers of parts of speech and feature vectors. The parts of speech metadata can identify the words as nouns, verbs, adjectives, and the like. The feature vectors can be alphanumeric codes representing pronunciations of the words. Embodiments of the dictionary generation module 231 determine the feature vectors representing the corresponding words based on the individual word's sounds or pronunciation. For example, the dictionary generation module 231 can use the SOUNDEX algorithm or the like to code the words in the dictionaries based on the sound of the words (e.g., both bear and bear can be coded as B600).

The authentication module 251 can verify credentials (e.g., authentication information 125) received by the server 110 are authentic based on the credentials 223 stored in the user accounts 123. Additionally, the authentication module 251 can transmit pass codes (e.g., text pass code 129) and prompts (e.g., prompt 127) to users requesting the users respond to the prompts with the text pass codes for verification. Further, the authentication module 251 can receive prompt responses (prompt response 133) with the text pass codes returned from the users. Moreover, the authentication module 251 can verify the prompt responses and based on the successful verification, authorize access to the protected resources 121.

The pass code generation module 255 can generate text pass codes (e.g., text pass code 129) for provision to users for authentication. The pass code generation module 255 can generate text pass codes by selecting and combining words from one or more of the dictionaries in dictionary library 131. Generating the text pass codes can include selecting the dictionaries based on user information, such as language, location, or regional accent. The pass code generation module 255 can select words for text pass codes to avoid ambiguity or confusion between words having similar pronunciations (e.g., bear and bare) or spellings (e.g., bear and beer).

The text-speech conversation module 257 can convert text-to-speech for generating audio text pass codes and can convert speech-to-text for interpreting spoken text pass codes included in prompt responses. The voice matching module 259 can compare words or textual phrases received in spoken prompt responses with voice prints 225 stored in the user accounts 123 to determine whether the spoken prompt responses match a voiceprint of a user requesting authorization.

It is noted that the server 110 can comprise any general-purpose computing article of manufacture capable of executing computer program instructions installed thereon (e.g., a personal computer, server, etc.). However, server 110 is only representative of various possible equivalent-computing devices that can perform the processes described herein. To this extent, in embodiments, the functionality provided by the server 110 can be any combination of general and/or specific purpose hardware and/or computer program instructions. In each embodiment, the program instructions and hardware can be created using standard programming and engineering techniques, respectively.

The components illustrated in FIG. 2 may be implemented in software and/or hardware. Each component may be distributed over multiple applications and/or machines. For example, it is understood that some or all of the protected resources 121, the user accounts 123, and the dictionary library 131 stored in storage system 209 can be stored at a location remote from the server 110. Additionally, it is understood, that one or more of the authentication module 251, the text pass code generation module 255, the text-speech conversion module 257, and voice matching module 259, can be stored and executed remotely from the server 111. For example, the client device 105 can include a text-speech conversion module 257 that performs speech-to-text conversion of voice inputs to text for responding to authentication prompts. Additionally, multiple components may be combined into one application and/or machine. Operations described with respect to one component may instead be performed by another component.

D. Authenticating with Textual Passcodes

Figure 3A:
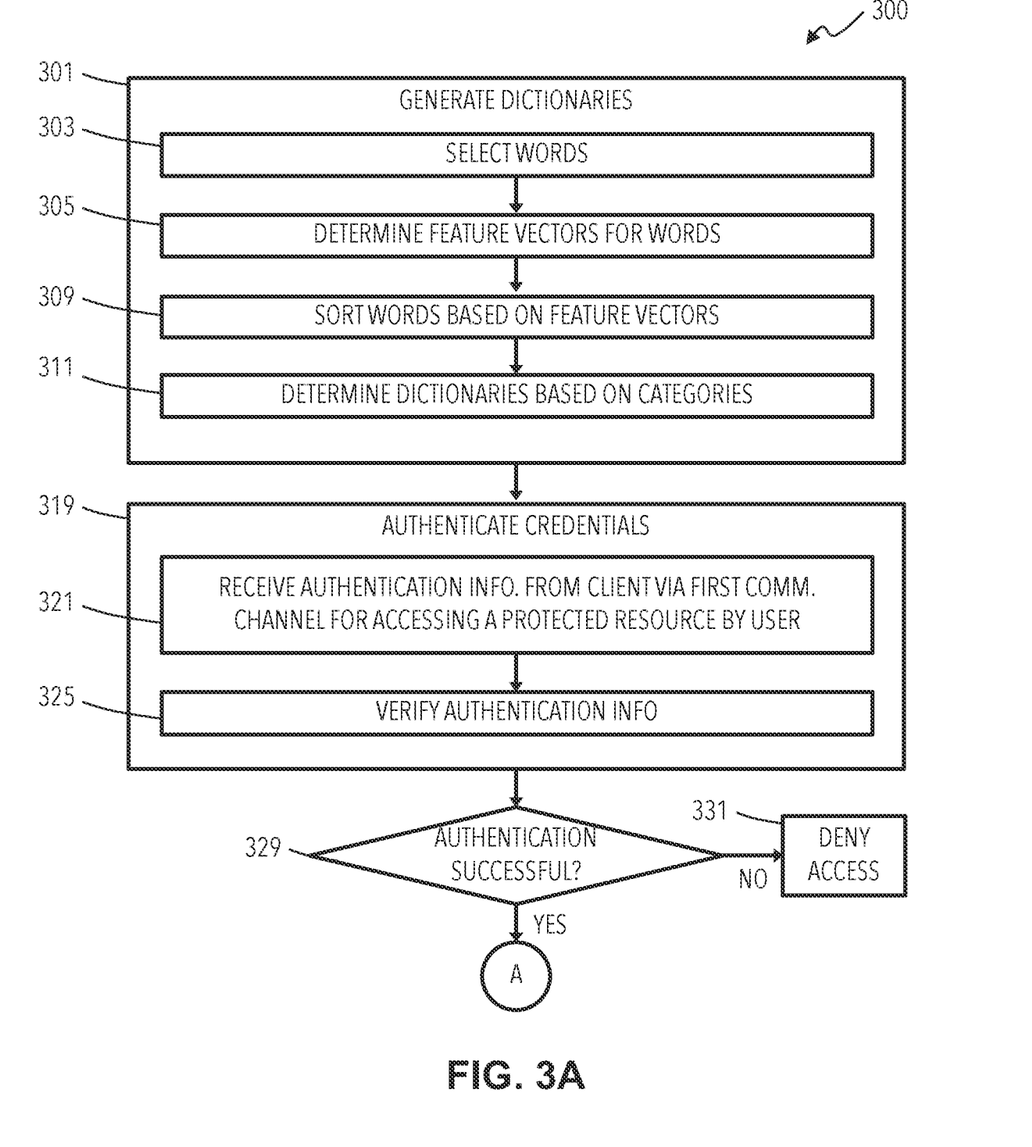
FIGS. 3A and 3B illustrate a set of operations of an example process for multiple factor authentication in accordance with one or more embodiments.
Figure 3B:
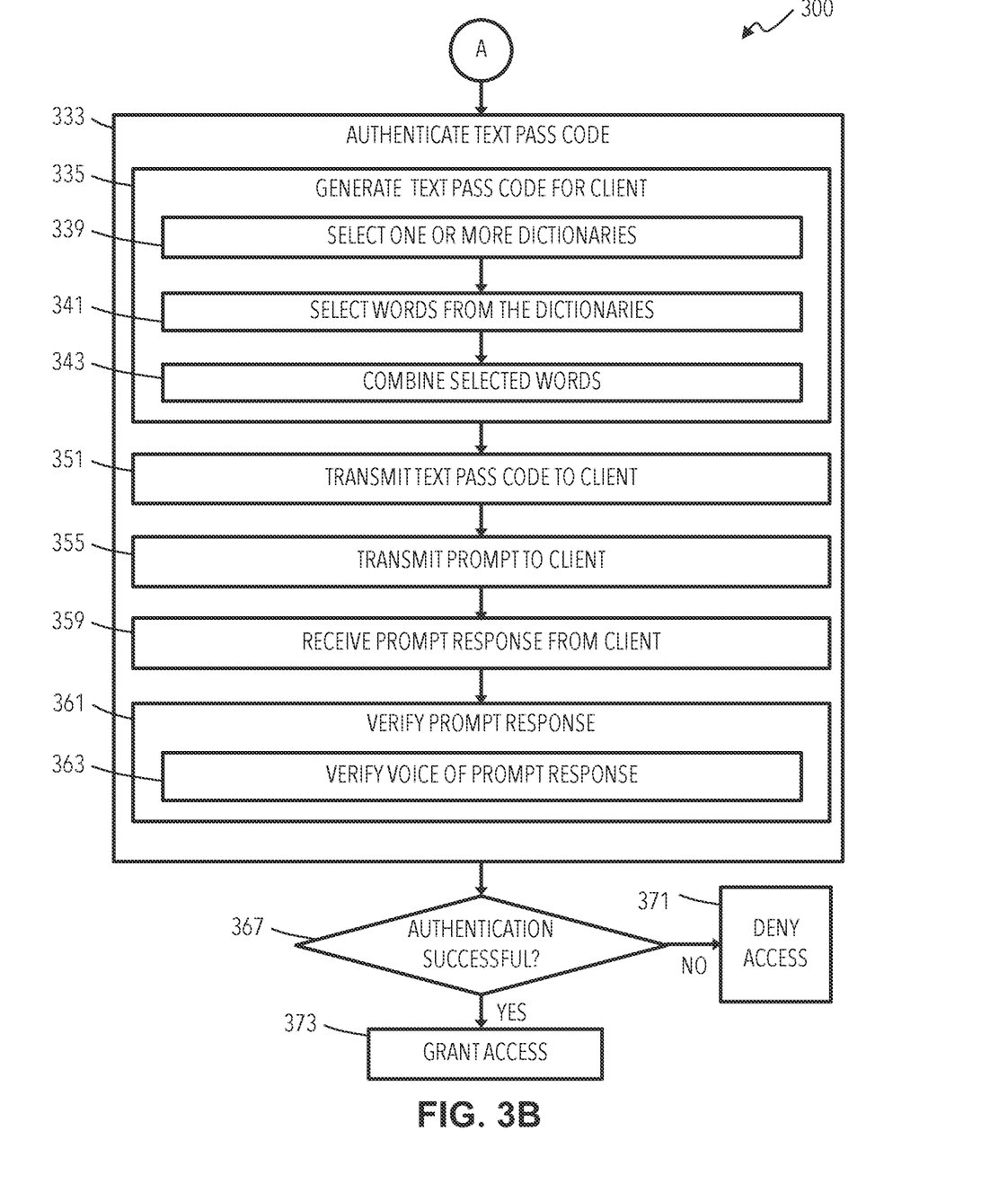

The flow diagram in FIGS. 3A and 3B illustrate functionality and operations of systems, devices, processes, and computer program products according to various implementations of the present disclosure. Each block in FIGS. 3A and 3B can represent a module, segment, or portion of program instructions, which includes one or more computer executable instructions for implementing the illustrated functions and operations. In some implementations, the functions and/or operations illustrated in a particular block of the flow diagrams can occur out of the order shown in FIGS. 3A and 3B. For example, two blocks shown in succession can be executed substantially concurrently, or the blocks can sometimes be executed in the reverse order, depending upon the functionality involved. Additionally, in some implementations, the blocks of the flow diagrams can be rearranged in different orders. Further, in some implementations, the flow diagram can include fewer blocks or additional blocks. It is also noted that each block of the flow diagrams and combinations of blocks in the flow diagrams can be implemented by special-purpose hardware-based systems that perform the specified functions or acts, or combinations of special-purpose hardware and computer instructions.

Figure 4:
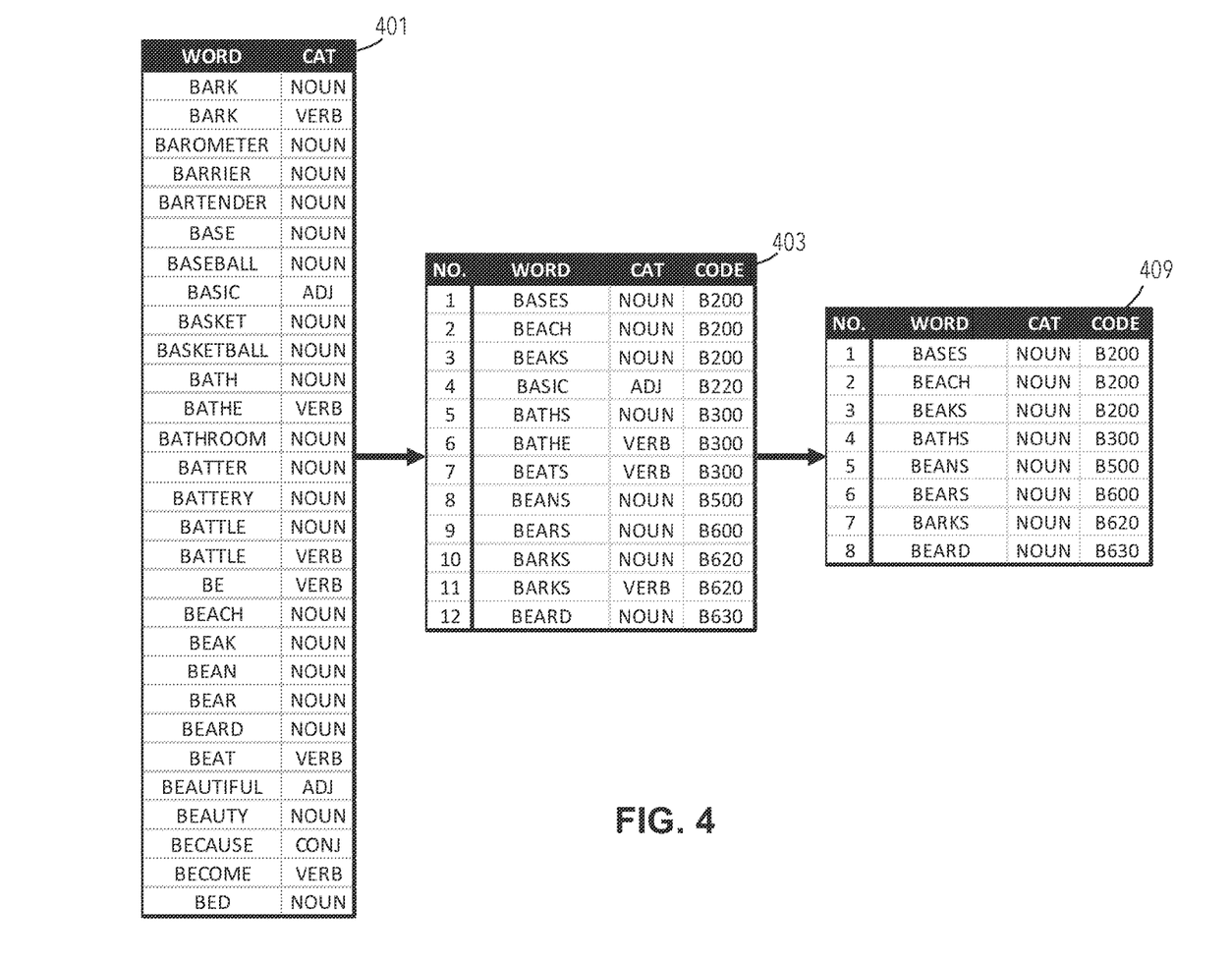
FIGS. 4 and 5 illustrate data structures storing example dictionaries in accordance with one or more embodiments.

FIGS. 3A and 3B illustrate a set of operations of an example process 300 for multiple factor authentication of a user using textual pass codes. At block 301, a system (e.g., server 110 executing dictionary generation module 245) generates custom dictionaries by importing words from, for example, one or more reference dictionaries or the like. The reference dictionaries can include words of one or more spoken languages. For example, table 401 in FIG. 4 illustrates part of a conventional English dictionary, including words and corresponding parts of speech.

Generating the custom dictionaries can include, at block 303, selecting words from the those imported at block 301 for inclusion in the custom dictionaries. Some embodiments limit selections to belonging to certain parts of speech, such as only nouns, verbs, and adjectives while excluding proper names, conjunctions, prepositions, and adverbs. Additionally, some embodiments exclude certain designated by the dictionary or other source as vulgar, salacious, insulting, or the like. Furthermore, some embodiments limit selections to words having a maximum length (e.g., less than 4 letters) or words having a particular length (e.g., equal to 4 letters). The selections can include variations of words, such as plural forms meeting the particular length (e.g., "bees" or "pups") and/or the gerund forms of verbs used as adjectives (e.g., running, jumping, flying, etc.), which may semantically connect with other words (e.g., "flying bees"). For example, FIG. 4 illustrates tables 401, 403, and 409. Table 403 can represent part of a listing of words obtained from one or more reference dictionaries and categories of the words. The categories can be metadata describing the words, such as: descriptors of the words part of speech, such as noun, adjective, verb, adverb, conjunction, vulgar, slang, archaic, etc. Table 403 represents part of an example custom dictionary generated using table 401 by selecting only five-letter words and excluding certain categories of words, including conjunctions, adverbs, and vulgar words.

Generating the dictionaries can also include, at block 305, determining feature vectors for the words selected at block 303. The feature vector can be an ordered string of alphanumeric characters (e.g., letters and/or numbers) representing how individual words are pronounced. For example, the system can use a SOUNDEX algorithm or the like to code the words into feature vectors representing the sounds of the words. For example, table 403 in FIG. 4 illustrates respective SOUNDEX codes mapped to the imported words. It is understood that other algorithms for generating the feature vectors can be used.

Generating the dictionaries can also include, at block 309, sorting the words selected at block 303 based on the feature vectors determined at block 305. As illustrated in table 403 of FIG. 4, the system can, for example, sort the words into a sequentially ordered list based on feature vectors from the lowest value to the highest, such that words having the same or similar feature vector values are listed together.

Generating the dictionaries can also include, at block 311, determining dictionaries based on one or more of categories. Embodiments of the system can categorize the ordered list of words determined at block 309 based on the respective parts of speech of the words. Some embodiments exclude other parts of speech, such as adverbs, prepositions, and contractions from the custom dictionaries. Some embodiments determine separate custom dictionaries comprised solely of individual parts of speech, such as nouns, verbs, and adjectives, that can be randomly selected and combined into text pass codes. For example, table 409 in FIG. 4 comprises part of a custom dictionary including only the nouns of table 403. It is understood that the example shown in FIG. 4 can also generate additional custom dictionaries solely including other parts of speech, such as a second dictionary including only adjectives and a third dictionary including only verbs.

At block 319, the system (e.g., executing authentication module 251) can authenticate credentials to verify a user's identity. The authentication can include, at block 321, receiving authentication information (e.g., authentication information 125) from a user (e.g., an individual using client device 105). The system can receive the authentication information via a first communication channel (e.g., communication channel 115A), such as the Internet. The authentication information can be a unique identifier of the user, such as a username and a password, a biometric input, or the like.

At block 325, the system can verify the received authentication information. For example, the system can determine that a user account (e.g., user accounts 123) include credential information (e.g., credentials 223) matching the authentication information received at block 305. At block 329, the system can determine whether the verification of block 319 was successful. If not (e.g., block 329 is "No"), then at block 331 the system can deny the user access to the system or the information resources protected by the system. Denying access can include communicating a message to the user indicating access was denied.

If at block 329, the system determines the credential authentication was successful (e.g., block 313 is "Yes"), then as indicated by off-page connector "A", the system can authenticate a text pass code to verify a user's identity at block 333. Text pass code authentication can include, at block 335, generating a text pass code (text pass code 129) for provision to the user. The text pass code can be a combination of words or a phrase. The system (e.g., executing pass code generation module 255) can generate the text pass code by randomly selecting words from one or more dictionaries determined at block 301. As described above, the dictionaries can be populated with a list of words ordered by feature vectors and associated with categories (e.g. parts of speech).

Generating the pass code can include, at block 339, selecting one or more of the dictionaries for generating the pass code. The selection can be based on a user profile (e.g., user account 123) or localization information (e.g., location, or accent detection) obtained from a user device (e.g., client device 105). As described above, some embodiments include multiple custom dictionaries including words or textual phrases corresponding to different languages, accents, or locations. Information used to select a dictionary for a particular user can be included in the user profile, provided by the user, or derived from localization information obtained from a user's device.

Generating the pass code can include, at block 341, selecting multiple words from one or more of the dictionaries selected at block 339. Some embodiments randomly select the words from one or more dictionaries. Some other embodiments randomly select feature vector values and identify words corresponding to the selected feature vectors. For example, the system can generate a random value (e.g., B620), determine a feature vector mapped the random value (e.g. B620 in table 403 of FIG. 6) and identify a word corresponding to the feature vector (e.g., "barks,", as illustrated in table 403). In situations where the random value maps to more than one feature vector (e.g., B300), then the system a randomly select one of the words mapped to the random value (e.g., "bath," "bathe," "beat," "beauty." and "bed" in table 403).

Figure 5:
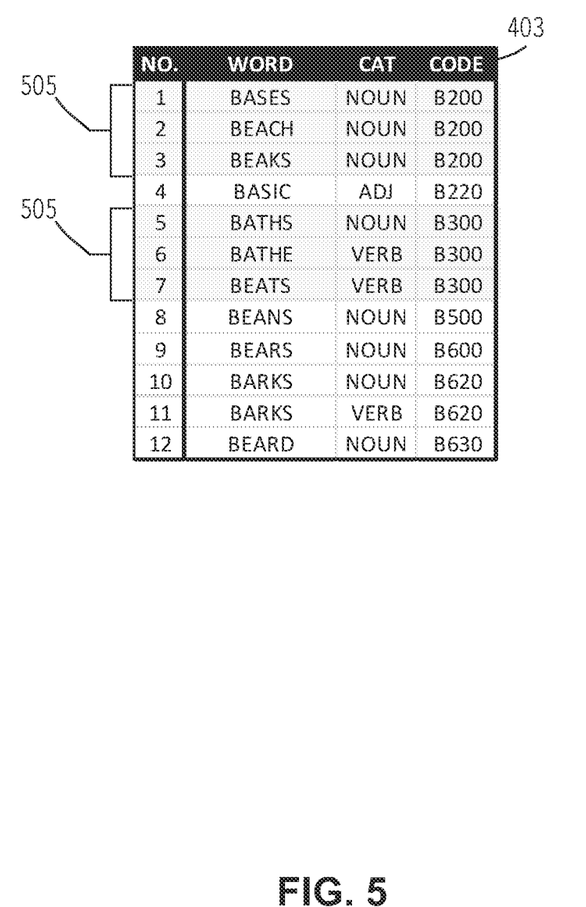

Some embodiments avoid selections of words having ambiguous pronunciations or spellings for inclusion in a pass code. One or more embodiments refrain from selecting words within a minimum distance (D) of one another in the ordered sequence of a selected dictionary. For example, as illustrated in FIG. 5, the words of the dictionary in table 403 are ordered in a sequence based corresponding feature vector values. The system can randomly select words that are greater than a distance 505 in the ordered sequence. The value of the distance 505 can be a whole number, such as 5, 10, or 15. In the example illustrated in FIG. 5, the distance 505 is 3. Accordingly, for example, the system can randomly select an adjective, "basic" and, based on that selection randomly select a known at least 3 words away from the word "basic" in the listing of words ordered based on feature vectors values. Thus, the system would avoid the selection of the noun, "baths" as the second word based on their distance being within 3 words in the list. On the other hand, the system could select the noun "bear" and combine it with "basic" to generate the text pass code "basic bear."

One or more other embodiments refrain from selecting words with feature vectors having one or more digits within a predetermined threshold value. For example, the system can select words that have feature vectors comprising 4 digits, wherein values of the second digit are different by at least a value of 2. More specifically, the feature vector of "beautiful" can be B314 and the feature vector of "bear" is B600. Hence, the second digits of the feature vectors are "3" and "6," respectively. Therefore, the difference between the values of second digit is greater than 2. However, the feature vector of "bases" is B200. Thus, there is no difference between the second digit of the feature vector of "bases" and that of "basic." Accordingly, the example system would refrain from selecting the word "bases" to avoid the combination of "basic bases," which sound similar and could cause ambiguity when used as a pass code. It is understood that embodiments can use other techniques to avoid ambiguity between the selected words. For example, for individual words in a first dictionary, the system can maintain corresponding dictionaries of unambiguous words.

Generating the pass code can also include, at block 343, combining the words selected at block 341. Some embodiments generate a combination by concatenating the selected words into a phrase. The concatenation can follow a pre-defined order of selection, such as [adjective]+[noun] or [adjective]+[noun]+[verb]. For example, the system can randomly select a first word of the text pass code (e.g., "brown") from an adjective dictionary, randomly select a second word of the text pass code (e.g., "bears") from a noun dictionary (e.g., table 409), and combine the first word and the second word to form a phrase (e.g., "brown bears"). Some embodiments can randomly select a third word ("sleep") of the text pass code from a verb dictionary and combine it with the other selections to form a phrase (e.g., "brown bears sleep"). It is understood that some embodiments can select and combine additional words to form longer phrases and/or different orders of words.

Some other embodiments generate pass codes including words that have a semantic connection. For example, the system can use a machine learning model trained to select words meeting a threshold correlation using natural language processing. Different machine learning models can be trained to combine words corresponding to different languages and regional accents by training the models using text corpuses corresponding to the different languages and/ or information. A machine learning algorithm is an algorithm that can be iterated to learn a target model f that best maps a set of input variables to an output variable, using a set of training data. A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, back-propagation, and/or clustering.

In some embodiments, training data includes datasets and associated labels. The datasets are associated with input variables (e.g., parts of speech) for the target model f. The associated labels are associated with the output variable (e.g., pass code phrases) of the target model f. The training data may be updated based on, for example, feedback on the accuracy of the current target model f. Some embodiments can train the machine learning models using examples obtained from web pages including text chats in different localities or from publicly-available natural language processing training corpuses. The text corpuses can be cleaned to remove punctuation and words excluded from example sentences (e.g., determiners, prepositions, conjunctions, vulgar words, proper names, etc.) and the remaining words can be annotated with respective parts of speech to which the words belong. Based on the example sentences, the system can generate training sentences by creating phrases of words that semantically follow a keyword in the text corpus. Using the sets of words, the system can generate training sentences having a predetermined length (e.g., 2 or 3 words) by first randomly selecting a keyword and then randomly determine a second word from the set of words that follow a keyword. Using the second word as a next keyword, the system randomly determine a third word from the set of words that follow a keyword. In some embodiments, the first keyword can be a particular part of speech, such as an adjective, and the set of sets of words that follow the adjective can be a set of nouns. Further, the set of words that follow the noun can be verbs.

A machine learning algorithm generates a target model f such that the target model f best fits the training data to the labels of the training data. Additionally or alternatively, a machine learning algorithm generates a target model f such that when the target model f is applied to the datasets of the training data, a maximum number of results determined by the target model f matches the labels of the training data. Updated training data is fed back into the machine learning algorithm, which in turn updates the target model f. One or more embodiments can update the trained machine learning modules based on receiving negative feedback on particular combinations of words such that the combination is not selected in a future selection operation. Negative feedback can be generated based on users failing to successfully verify a prompt response. For example, the system can record words or phrases corresponding to retries by users as negative feedback. Accordingly, the machine learning model can improve the selection of semantically connected words over time.

At block 351, the system can transmit the text pass code (e.g., text pass code 129) to the user using a communication channel different than the communication channel used at block 305. For example, the system can transmit the text pass code to the client device using a telephonic communication channel (e.g., communication channel 115B). Alternatively, using a telephone number of the user stored in the user accounts, the system can transmit a multimedia message containing text pass code in text and audio formats on one of the user's client devices. The system can generate the audio of the text pass code by converting text pass code generated at block 335 into spoken words using a text-to-speech converter (e.g., text-speech conversion module 257). Additionally, the system can temporarily store a copy of the text pass code for comparison to the user's response. One or more embodiments delete the stored copy or invalidate the stored copy of the text pass code after a predetermined, limited period of time (e.g., one minute).

Additionally, at block 355, the system can transmit a prompt (e.g. prompt 127) to the client requesting the user transmit a response (e.g. prompt response 133) including the text pass code transmitted at block 351. The system can send the authentication prompt as text, as audio, or as both text and audio. The prompt can include a selectable option for the user to communicate the text pass code using a keyboard input or microphone. For example, using the communication channel used at block 319 or the communication channel used at block 351, the system can generate an interactive display at the user's device requesting entry of the text pass code transmitted at block 351.

At block 359, the system can receive the prompt response from the user. The content of the prompt response can be text or audio (e.g., a spoken word or phrase), as provided by the user. For example, using the client device that received the prompt at block 359, the user can enter the text pass code transmitted at block 351 as text using a keyboard or as audio of the user's spoken voice using a microphone. Also, some embodiments of the client device convert users' spoken voice responses to text using a local speech-to-text converter. At block 361, the system can verify the pass code received in the prompt response at block 359 by comparing the word or textual phrase received from the user to the word or textual phrase sent to the user in the text code at block 351.

One or more embodiments determine that received phrase matches or substantially matches the word or textual phrase provided in the prompt. Substantial matches may be near misses or homonyms. Near misses may be common misspellings or typographical errors. For example, as described above, the text pass code sent to the user can be the ten character phrase: "brown bears." The response received by the system could be the exact match, "brown bears." The response by the system could also be a near miss, such as "brown bear," due to the misinterpretation by the user or by the speech-to-text conversion Additionally, the response by the system could be a common spelling error where a key adjacent to a correct key is struck, such as "Briwn Bears," which may occur when a user miss-strikes the "i" key adjacent to the correct "o" key. The match and near misses can be a predefined set of verifiable alternative prompt responses to a particular prompt. One or more embodiments determine the alternatives by generating a set of interpretations using alternative interpretations of the vocalized prompt generated by the text-speech module. For example, a machine learning model trained for speech recognition can generate a set of candidate alternatives for the input "brown bears," instead of a single best interpretation. One or more embodiments determine near misses by converting the words of the textual phrase into feature vector and comparing the determined feature vector to the feature vectors of the text pass code generated at block 335.

Verifying the prompt response can include, at block 363, verifying the voice of audio prompt responses received at block 359 including the user's spoken voice. Verifying the voice can include using voice matching techniques to compare the voice received at block 359 to a vocal profile included in a user account. At block 367, the system can determine whether the verification of block 329 was successful. If not (e.g., block 367 is "No"), then at block 371 system can deny the user access to the system or the information resources protected by the system. As above, denying access can include communicating a message to the user indicating access was denied. If the verification at block 329 was successful (e.g., block 337 is "Yes"), then at block 373 the system can grant access to the server and/or the requested protected resource. Additionally, the system can transmit an authorization message to the user. The user can then access the system and/or the protected resource.

E. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

F. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the present disclosure, and what is intended by the applicants to be the scope of the claims, is the literal and equivalent scope of the set of claims that issue from this application, in the specific form in which such claims issue, including any subsequent correction.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the present disclosure, and what is intended by the applicants to be the scope of the claims, is the literal and equivalent scope of the set of claims that issue from this application, in the specific form in which such claims issue, including any subsequent correction.

What is claimed is:

1. A non-transitory computer-readable medium comprising instructions which, when executed by one or more hardware processors, causes performance of operations comprising:
   receiving, from a user via a first communication channel corresponding to the user, authentication information for authenticating the user for access to a resource;
   verifying the authentication information to successfully complete a first step of an authentication process;
   responsive to successfully completing the first step of the authentication process, initiating a second step of the authentication process by:
      selecting text comprising a plurality of words to be spoken by the user based at least on a distance value meeting a minimum difference, the distance value representing a difference between (a) a first feature vector corresponding to a first word of the plurality of words and (b) a second feature vector corresponding to a second word of the plurality of words, the first feature vector and the second feature vector corresponding to different pronunciations and/or spellings of the first word and second word, respectively; and
      transmitting the text to be spoken by the user;
   receiving, from the user, voice input that vocalizes the text transmitted to the user;
   verifying the voice input to successfully complete the second step of the authentication process; and
   responsive to successfully completing the second step of the authentication process, granting access to the resource.

2. The computer-readable medium of claim 1, wherein:
   selecting the text comprising the plurality of words based at least on the distance value comprises selecting the first word from a first subset of words and the second word from a second subset of words, and
   the first subset of words and the second subset of words are such that a second minimum difference, between (a) any feature vector in a first set of feature vectors corresponding respectively to the first subset of words and (b) any feature vector in a second set of feature vectors corresponding respectively to the second subset of words, meets a threshold value.

3. The computer-readable medium of claim 1, wherein selecting the text comprising the plurality of words is based further on a regional accent of a user.

4. The computer-readable medium of claim 1, wherein:
   selecting the text comprising the plurality of words comprises applying a machine learning model configured to select the plurality of words, and
   the operations further comprise:
      receiving negative feedback corresponding to the plurality of words; and
      updating the machine learning model based on the negative feedback corresponding to the plurality of words so that the selected plurality of words is not selected in a future selection operation.

5. The computer-readable medium of claim 1, wherein selecting the text is further based on a semantic connection value representing a semantic connection between the first word and the second word meeting a threshold value.

6. The computer-readable medium of claim 1, wherein selecting the text is further based on detecting the plurality of words in a consecutive order in a text corpus.

7. The computer-readable medium of claim 1, wherein verifying the voice input comprises:

mapping the voice input to an alphanumerical code, and verifying the alphanumerical code.

8. The computer-readable medium of claim 1, wherein a number of words in the plurality of words is one of: two, three, or four.

9. A method comprising:
receiving, from a user via a first communication channel corresponding to the user, authentication information for authenticating the user for access to a resource;
verifying the authentication information to successfully complete a first step of an authentication process;
responsive to successfully completing the first step of the authentication process, initiating a second step of the authentication process by:
selecting text comprising a plurality of words to be spoken by the user based at least on a distance value meeting a minimum difference, the distance value representing a difference between (a) a first feature vector corresponding to a first word of the plurality of words and (b) a second feature vector corresponding to a second word of the plurality of words, the first feature vector and the second feature vector corresponding to different pronunciations and/or spellings of the first word and second word, respectively; and
transmitting the text to be spoken by the user;
receiving, from the user, voice input that vocalizes the text transmitted to the user;
verifying the voice input to successfully complete the second step of the authentication process; and
responsive to successfully completing the second step of the authentication process, granting access to the resource,
wherein the method is performed by at least one device including a hardware processor.

10. The method of claim 9, wherein:
selecting the text comprising the plurality of words based at least on the distance value comprises selecting the first word from a first subset of words and the second word from a second subset of words, and
the first subset of words and the second subset of words are such that a second minimum difference, between (a) any feature vector in a first set of feature vectors corresponding respectively to the first subset of words and (b) any feature vector in a second set of feature vectors corresponding respectively to the second subset of words, meets a threshold value.

11. The method of claim 9, wherein selecting the text comprising the plurality of words is based further on a regional accent of a user.

12. The method of claim 9, wherein:
selecting the text comprising the plurality of words comprises applying a machine learning model configured to select the plurality of words, and
the method further comprises:
receiving negative feedback corresponding to the plurality of words; and
updating the machine learning model based on the negative feedback corresponding to the plurality of words so that the selected plurality of words is not selected in a future selection operation.

13. The method of claim 9, wherein selecting the text is further based on a semantic connection value representing a semantic connection between the first word and the second word meeting a threshold value.

14. The method of claim 9, wherein selecting the text is further based on detecting the plurality of words in a consecutive order in a text corpus.

15. The method of claim 9, wherein verifying the voice input comprises:
mapping the voice input to an alphanumerical code, and verifying the alphanumerical code.

16. The method of claim 9, wherein a number of words in the plurality of words is one of: two, three, or four.

17. A system comprising:
one or more non-transitory computer readable media storing instructions;
one or more hardware processors configured to execute the instructions to perform operations comprising:
receiving, from a user via a first communication channel corresponding to the user, authentication information for authenticating the user for access to a resource;
verifying the authentication information to successfully complete a first step of an authentication process;
responsive to successfully completing the first step of the authentication process, initiating a second step of the authentication process by:
selecting text comprising a plurality of words to be spoken by the user based at least on a distance value meeting a minimum difference, the distance value representing a difference between (a) a first feature vector corresponding to a first word of the plurality of words and (b) a second feature vector corresponding to a second word of the plurality of words, the first feature vector and the second feature vector corresponding to different pronunciations and/or spellings of the first word and second word, respectively; and
transmitting the text to be spoken by the user;
receiving, from the user, voice input that vocalizes the text transmitted to the user;
verifying the voice input to successfully complete the second step of the authentication process; and
responsive to successfully completing the second step of the authentication process, granting access to the resource.

18. The system of claim 17, wherein:
selecting the text comprising the plurality of words based at least on the distance value comprises selecting the first word from a first subset of words and the second word from a second subset of words, and
the first subset of words and the second subset of words are such that a second minimum difference, between (a) any feature vector in a first set of feature vectors corresponding respectively to the first subset of words and (b) any feature vector in a second set of feature vectors corresponding respectively to the second subset of words, meets a threshold value.

19. The system of claim 17, wherein selecting the text comprising the plurality of words is based further on a regional accent of a user.

20. The system of claim 17, wherein:
selecting the text comprising the plurality of words comprises applying a machine learning model configured to select the plurality of words, and
the operations further comprise:
receiving negative feedback corresponding to the plurality of words; and
updating the machine learning model based on the negative feedback corresponding to the plurality of words so that the selected plurality of words is not selected in a future selection operation.

21. The system of claim 17, wherein selecting the text is further based on a semantic connection value representing a semantic connection between the first word and the second word meeting a threshold value.

22. The system of claim 17, wherein selecting the text is further based on detecting the plurality of words in a consecutive order in a text corpus.

23. The system of claim 17, wherein verifying the voice input comprises:
   mapping the voice input to an alphanumerical code, and
   verifying the alphanumerical code.

24. The system of claim 17, wherein a number of words in the plurality of words is one of: two, three, or four.

\* \* \* \* \*